(12) United States Patent
Otake et al.

(10) Patent No.: US 11,387,759 B2
(45) Date of Patent: Jul. 12, 2022

(54) ROTATION ELECTRIC MACHINE CONTROLLER

(71) Applicant: DENSO CORPORATION, Kariya (JP)

(72) Inventors: Hiroyasu Otake, Kariya (JP); Takashi Suzuki, Kariya (JP)

(73) Assignee: DENSO CORPORATION, Kariya (JP)

(*) Notice: Subject to any disclaimer, the term of this patent is extended or adjusted under 35 U.S.C. 154(b) by 102 days.

(21) Appl. No.: 16/507,371

(22) Filed: Jul. 10, 2019

(65) Prior Publication Data

US 2020/0021219 A1    Jan. 16, 2020

(30) Foreign Application Priority Data

Jul. 13, 2018    (JP) .............................. JP2018-133576

(51) Int. Cl.
| | |
|---|---|
| *H02P 6/34* | (2016.01) |
| *H02P 6/10* | (2006.01) |
| *H02P 21/20* | (2016.01) |
| *H02P 27/04* | (2016.01) |
| *B60L 15/02* | (2006.01) |
| *H02P 6/06* | (2006.01) |

(52) U.S. Cl.
CPC ............ *H02P 21/20* (2016.02); *B60L 15/025* (2013.01); *H02P 6/06* (2013.01); *H02P 27/04* (2013.01); *B60L 2240/429* (2013.01)

(58) Field of Classification Search
CPC .......... H02P 21/22; H02P 3/18; H02P 29/032
See application file for complete search history.

(56) References Cited

U.S. PATENT DOCUMENTS

| | | | | |
|---|---|---|---|---|
| 2010/0277111 | A1* | 11/2010 | Kitanaka ................. | H02P 21/06 318/400.02 |
| 2016/0204727 | A1* | 7/2016 | Fujii ....................... | H02P 25/22 318/400.02 |
| 2018/0079447 | A1* | 3/2018 | Yamashita ........... | B62D 5/0469 |

FOREIGN PATENT DOCUMENTS

| | | |
|---|---|---|
| JP | 3686987 B2 | 8/2005 |
| JP | 2006-254572 A | 9/2006 |

OTHER PUBLICATIONS

U.S. Appl. No. 16/507,392, filed July 10, 2019, Hiroyasu Otake.

* cited by examiner

*Primary Examiner* — Muhammad S Islam
*Assistant Examiner* — Charles S Laughlin
(74) *Attorney, Agent, or Firm* — Maschoff Brennan

(57) ABSTRACT

A rotation electric machine controller includes: a torque command value acquisition section that acquires a torque command value for a rotation electric machine; and a setting section that sets a negative limit value limiting a d-axis current command value. The setting section sets the limit value having a larger absolute value in a case where the torque command value is large, in comparison to a case where the torque command value is small.

8 Claims, 8 Drawing Sheets

ROTATION ELECTRIC MACHINE CONTROLLER

CROSS REFERENCE TO RELATED APPLICATION

The present application claims the benefit of priority from Japanese Patent Application No. 2018-133576 filed on Jul. 13, 2018. The entire disclosures of all of the above applications are incorporated herein by reference.

TECHNICAL FIELD

The present disclosure relates to a rotation electric machine controller.

BACKGROUND

A control device configured to limit a d-axis current command value in accordance with a q-axis current command value of a rotation electric machine has been known.

SUMMARY

The present disclosure provides a controller for a rotation electric machine. The controller is configured to acquire a torque command value, and set a negative limit value limiting a d-axis current command value.

BRIEF DESCRIPTION OF DRAWINGS

The above and other objects, features, and advantages of the present disclosure will become more apparent from the following detailed description with reference to the accompanying drawings. In the drawings.

DETAILED DESCRIPTION

There has been known a control device configured to limit a d-axis current command value in accordance with a q-axis current command value of a rotation electric machine. The related art discloses setting a predetermined negative limit value of a voltage command value of the rotation electric machine to achieve substantially constant output at around upper limit use voltage of the rotation electric machine, and the d-axis current command value is limited to be more than the limit value.

When the limit value is set to be small, in other words, when the negative limit value has an absolute value set to be large, d-axis current has a negative value and a large absolute value to possibly cause overheat of the rotation electric machine. The rotation electric machine is configured to generate torque that is decreased as rotational speed increases. The d-axis current needs to have a negative value and a large absolute value for inhibition of decrease in torque that can be generated by the rotation electric machine. When the limit value is set to be large, in other words, when the negative limit value has an absolute value set to be small, decrease in torque of the rotation electric machine may not be inhibited in the above case.

The present disclosure provides a controller configured to appropriately limit a d-axis current command value of a rotation electric machine.

According to one aspect of the present disclosure, a rotation electric machine controller that controls a rotation electric machine is provided. The rotation electric machine controller may include: a torque command value acquisition section that acquires a torque command value for the rotation electric machine; and a setting section that sets a negative limit value limiting a d-axis current command value of the rotation electric machine, the d-axis current command value being calculated in accordance with the torque command value. The setting section may set the limit value having a larger absolute value in a case where the torque command value is large, in comparison to a case where the torque command value is small.

According to another aspect of the present disclosure, a system for a rotation electric machine is provided. The system may include: an electric power steering device that outputs torque according to operation of a steering wheel; a rotation electric machine that is included in the electric power steering device; and the rotation electric machine controller. The torque command value may increase as torque output from the rotation electric machine increases.

The rotation electric machine has increase in rotational speed and decrease in torque in the case where the torque command value is large. The absolute value of the negative limit value needs to be set to be large for inhibition of decrease in torque. In the other case where the torque command value is small, the absolute value of the negative limit value needs to be set to be small for inhibition of overheat of the rotation electric machine. The torque command value and the limit value are thus correlated to each other. The controller for the rotation electric machine according to the present disclosure sets the absolute value of the negative limit value to be larger in the case where the torque command value is large in comparison to the case where the torque command value is small. It may be possible to inhibit decrease in torque of the rotation electric machine in the case where the torque command value is large. It may be possible to inhibit overheat of the rotation electric machine in the case where the torque command value is small. Therefore, it may be possible to limit the d-axis current command value of the rotation electric machine appropriately.

First Embodiment

A rotation electric machine control system of a vehicle 100 including a controller for a rotation electric machine according to a first embodiment will be described below with reference to the drawings. The controller according to the present embodiment configures the rotation electric machine control system of an electric power steering (EPS)

device 10 that assists steering by a driver. A rotation electric machine may be referred to as a dynamo-electric machine. A controller for a rotation electric machine may be referred to as a rotation electric machine controller. A controller may be referred to as a control apparatus.

Figure 1:
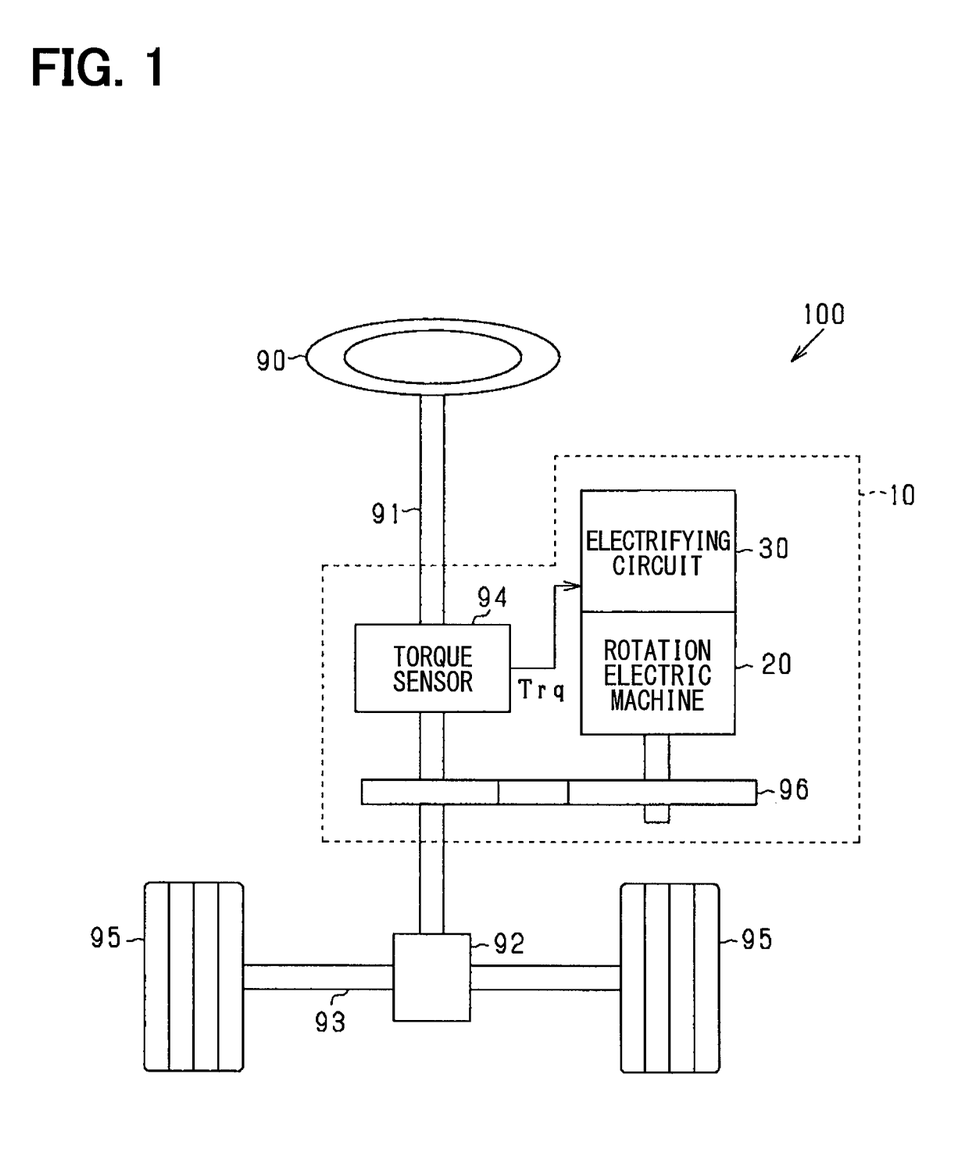
FIG. 1 is a diagram illustrating an entire configuration of an in-vehicle rotation electric machine system.

FIG. 1 shows the vehicle 100 including a steering wheel 90, a steering shaft 91, a pinion gear 92, a rack shaft 93, and the EPS device 10. The steering shaft 91 is connected to the steering wheel 90. The steering shaft 91 has a distal end provided with the pinion gear 92. The pinion gear 92 engages with the rack shaft 93. The rack shaft 93 has ends each provided with a wheel 95 rotatably coupled via a tie rod or the like. The steering shaft 91 is rotated when the driver rotates the steering wheel 90. The pinion gear 92 converts rotary motion of the steering shaft 91 to linear motion of the rack shaft 93. The wheels 95 are steered to have a steering angle according to displacement of the rack shaft 93.

The EPS device 10 includes a torque sensor 94, a speed reducer 96, a rotation electric machine 20, and an electrifying circuit 30. The torque sensor 94 is provided at the steering shaft 91, and detects steering torque Trq output from the steering shaft 91. The rotation electric machine 20 generates assist torque according to the steering torque Trq thus detected and a steering direction of the steering wheel 90. The electrifying circuit 30 drive-controls the rotation electric machine 20. The speed reducer 96 is configured to decelerate rotation of a rotary shaft included in a rotor of the rotation electric machine 20 as well as transmit the assist torque to the steering shaft 91.

Figure 2:
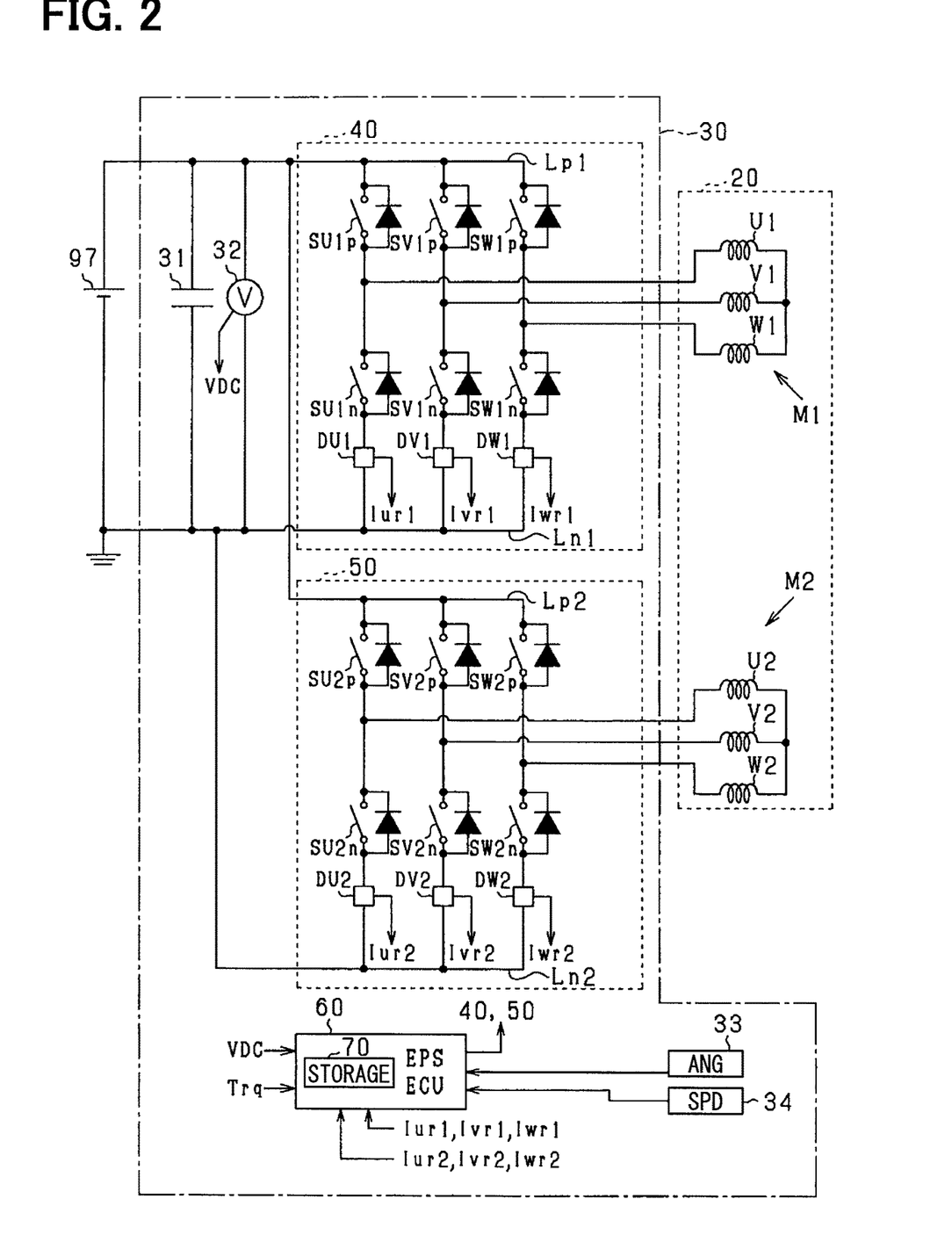
FIG. 2 is a diagram showing a configuration of an electrifying circuit and a rotation electric machine.

The rotation electric machine 20 and the electrifying circuit 30 will be described with reference to FIG. 2.

The rotation electric machine 20 may be of a permanent magnet field type or a coil field type. The rotation electric machine 20 includes a stator having a first coil group M1 and a second coil group M2. The first coil group M1 includes a first U-phase coil U1, a first V-phase coil V1, and a first W-phase coil W1 being star-connected. The second coil group M2 includes a second U-phase coil U2, a second V-phase coil V2, and a second W-phase coil W2 being star-connected. The first U, V, and W-phase coils U1, V1, and W1 have first ends connected to one another at a neutral point. The first U, V, and W-phase coils U1, V1, and W1 are shifted from one another by 120 degrees in terms of an electrical angle $\theta e$. The second U, V, and W-phase coils U2, V2, and W2 have first ends connected to one another at a neutral point. The second U, V, and W-phase coils U2, V2, and W2 are shifted from one another by 120 degrees in terms of the electrical angle $\theta e$.

The electrifying circuit 30 includes a first inverter 40 and a second inverter 50 each functioning as a power converter. In the first inverter 40, a node between first U-phase upper and lower arm switches SU1$p$ and SU1$n$ is connected to a second end of the first U-phase coil U1. A node between first V-phase upper and lower arm switches SV1$p$ and SV1$n$ is connected to a second end of the first V-phase coil V1. A node between first W-phase upper and lower arm switches SW1$p$ and SW1$n$ is connected to a second end of the first W-phase coil W1. In the second inverter 50, a node between second U-phase upper and lower arm switches SU2$p$ and SU2$n$ is connected to a second end of the second U-phase coil U2. A node between second V-phase upper and lower arm switches SV2$p$ and SV2$n$ is connected to a second end of the second V-phase coil V2. A node between second W-phase upper and lower arm switches SW2$p$ and SW2$n$ is connected to a second end of the second W-phase coil W2.

Each of the switches SU1$p$ to SW2$n$ has only to be configured as a voltage-controlled semiconductor switching element such as an IGBT (insulated gate bipolar transistor) or a MOSFET (metal-oxide-semiconductor field-effect transistor). Each of the switches SU1$p$ to SW2$n$ is anti-parallelly connected to a diode.

The electrifying circuit 30 includes a first high-potential path Lp1, a first low-potential path Ln1, a second high-potential path Lp2, a second low-potential path Ln2, and a capacitor 31. The first U, V, and W-phase upper arm switches SU1$p$, SV1$p$, and SW1$p$ each have a high-potential terminal connected, via the first high-potential path Lp1, to a positive electrode terminal of a battery 97 functioning as a direct-current power source. The first U, V, and W-phase lower arm switches SU1$n$, SV1$n$, and SW1$n$ each have a low-potential terminal connected to a negative electrode terminal of the battery 97 via the first low-potential path Ln1. The negative electrode terminal of the battery 97 is connected to ground. The second U, V, and W-phase upper arm switches SU2$p$, SV2$p$, and SW2$p$ each have a high-potential terminal connected to the positive electrode terminal of the battery 97 via the second high-potential path Lp2 and the first high-potential path Lp1. The second U, V, and W-phase lower arm switches SU2$n$, SV2$n$, and SW2$n$ each have a low-potential terminal connected to the negative electrode terminal of the battery 97 via the second low-potential path Ln2 and the first low-potential path Ln1.

The electrifying circuit 30 includes a current sensor. In the first inverter 40, the low-potential terminals of the first U, V, and W-phase lower arm switches SU1$n$, SV1$n$, and SW1$n$ and the first low-potential path Ln1 are connected by electrical paths provided with first U, V, and W-phase current sensors DU1, DV1, and DW1, respectively. The first U, V, and W-phase current sensors DU1, DV1, and DW1 are configured to detect current flowing through the electrical paths and output the detected current as first U, V, and W-phase current Iur1, Ivr1, and Iwr1, respectively.

In the second inverter 50, the low-potential terminals of the second U, V, and W-phase lower arm switches SU2$n$, SV2$n$, and SW2$n$ and the second low-potential path Ln2 are connected by electrical paths provided with second U, V, and W-phase current sensors DU2, DV2, and DW2, respectively. The second U, V, and W-phase current sensors DU2, DV2, and DW2 are configured to detect current flowing through the electrical paths and output the detected current as second U, V, and W-phase current Iur2, Ivr2, and Iwr2, respectively.

The electrifying circuit 30 includes a voltage sensor 32, an angle sensor 33, and a vehicle speed sensor 34. The voltage sensor 32 detects terminal voltage of the capacitor 31 as source voltage VDC. The angle sensor 33 outputs an angle signal according to the electrical angle $\theta e$ of the rotation electric machine 20. The angle sensor 33 may include a magnet serving as a magnetism generator provided at a rotor of the rotation electric machine 20, and a magnetism detection element provided adjacent to the magnet. The vehicle speed sensor 34 detects vehicle speed Vm of the vehicle 100. The voltage sensor 32, the angle sensor 33, the vehicle speed sensor 34, and the torque sensor 94 each output a signal received by an EPS ECU 60 included in the electrifying circuit 30.

The EPS ECU 60 is configured mainly by a microcomputer, and operates the switches of the first and second inverters 40 and 50 to control the torque of the rotation electric machine 20 to reach a torque command value Tr*. The torque command value Tr* is set exemplarily in accordance with the steering torque Trq detected by the torque sensor 94. The EPS ECU 60 calculates the electrical angle $\theta e$ of the rotation electric machine 20 in accordance with the signal output from the angle sensor 33. The EPS ECU 60 has a function that can be exerted by software recorded in a non-transitory tangible storage medium and a computer configured to execute the software, hardware, or a combination thereof. The EPS ECU 60 according to the present embodiment corresponds to a "controller".

The rotation electric machine 20 will be described with reference to FIG. 3 in terms of torque control processing executed by the EPS ECU 60.

A two-phase converter 73 converts the U, V, and W-phase current Iur1, Ivr1, and Iwr1 in a three-phase fixed coordinate system of the rotation electric machine 20 to first d- and q-axis current Idr1 and Iqr1 in a two-phase rotary coordinate system (dq coordinate system) in accordance with the phase current Iur1, Ivr1, and Iwr1 detected by the current sensors for the first coil group M1 and the electrical angle θe. The two-phase converter 73 further converts the U, V, and W-phase current Iur2, Ivr2, and Iwr2 to second d- and q-axis current Idr2 and Iqr2 in the dq coordinate system in accordance with the phase current Iur2, Ivr2, and Iwr2 detected by the current sensors for the second coil group M2 and the electrical angle θe.

A second converter 74 converts the first and second d-axis current Idr1 and Idr2 to d-axis current Idr and differential d-axis current Idr # and outputs the obtained current. The d-axis current Idr is obtained by halving a value obtained through adding the first d-axis current Idr1 and the second d-axis current Idr2, and the differential d-axis current Idr # is obtained by halving a value obtained through subtracting the second d-axis current Idr2 from the first d-axis current Idr1. The second converter 74 similarly converts the first and second q-axis current Iqr1 and Iqr2 to q-axis current Iqr and differential q-axis current Iqr # and outputs the obtained current.

A torque set portion 61 sets the torque command value Tr* in accordance with the steering torque Trq detected by the torque sensor 94. As indicated in FIG. 4, the torque set portion 61 stores a conversion table indicating relation between the steering torque Trq and basic assist torque Trk. The conversion table has relation that the basic assist torque Trk increases as the steering torque Trq increases. The torque set portion 61 acquires the basic assist torque Trk in accordance with the steering torque Trq with reference to the conversion table, and applies stabilization control such as differentiation control to the basic assist torque Trk thus acquired to set the torque command value Tr*. Examples of the stabilization control include the differentiation control for securing stability of the torque command value Tr*.

A torque command value limiter 62 limits the torque command value Tr* if the torque command value Tr* set by the torque set portion 61 is excessive. Specifically, the torque command value limiter 62 limits the torque command value Tr* in accordance with predetermined reference power in an exemplary case where the torque of the rotation electric machine 20 is controlled to be the torque command value Tr* and the battery 97 outputs power higher than the reference power. Examples of the reference power include normal rated power of the battery 97. The torque command value limiter 62 specifically limits the torque command value Tr* in accordance with temperature of the rotation electric machine 20, the first inverter 40, and the second inverter 50 in an exemplary case where these devices are overheating.

A current command value set portion 63 sets d- and q-axis current command values Id* and Iq* causing the sum of torque output from the first coil group M1 and the second coil group M2 to be equal to the torque command value Tr*, in accordance with the torque command value Tr* output from the torque command value limiter 62. The current command value set portion 63 sets the d- and q-axis current command values Id* and Iq* with reference to d- and q-axis torque maps MPd and MPp preliminarily stored in a storage 70 included in the EPS ECU 60. The d- and q-axis torque maps MPd and MPp provide map information including the d- and q-axis current command values Id* and Iq* prescribed to be in association with the torque command value Tr*. Examples of the storage 70 include a nontransitive substantive recording medium other than a ROM (e.g. a nonvolatile memory other than a ROM).

A d-axis current command value limiter 65 limits the d-axis current command value Id*, which is set by the current command value set portion 63, to a predetermined negative limit value Idm if the d-axis current command value Id* is less than the limit value Idm, in other words, if the negative d-axis current command value Id* has an absolute value more than an absolute value of the limit value Idm. The absolute value of the d-axis current command value Id* can thus become excessively large to inhibit overheat of the rotation electric machine 20, the first inverter 40, and the second inverter 50.

A FB controller 66 calculates d- and q-axis voltage command values Vd* and Vq* as control input for feedback control of the d- and q-axis current Idr and Iqr, which are output from the second converter 74, to the d- and q-axis current command values Id* and Iq*. Specifically, the FB controller 66 calculates d- and q-axis current deviations ΔId and ΔIq as values obtained by subtracting the d- and q-axis current Idr and Iqr from the d- and q-axis current command values Id* and Iq*. The FB controller 66 calculates the d- and q-axis voltage command values Vd* and Vq* as control input for feedback control of the calculated d- and q-axis current deviations ΔId and ΔIq to zero. The FB controller 66 further calculates differential d- and q-axis voltage command values Vd #* and Vq #* as control input for feedback control of the differential d- and q-axis current Idr # and Iqr #, which are output from the second converter 74, to zero. Examples of the feedback control executed by the FB controller 66 include proportional integral control.

A first converter 67 converts the d-axis voltage command value Vd* and the differential d-axis voltage command value Vd #* to a first d-axis voltage command value Vd1* for the first coil group M1 and a second d-axis voltage command value Vd2* for the second coil group M2. The first and second d-axis voltage command values Vd1* and Vd2* are exemplarily obtained by halving a value obtained through adding the d-axis voltage command value Vd* and the differential d-axis voltage command value Vd #*. The first converter 67 similarly converts the q-axis voltage command value Vq* and the differential q-axis voltage command value Vq #* to a first q-axis voltage command value Vq1* for the first coil group M1 and a second q-axis voltage command value Vq2* for the second coil group M2.

A three-phase converter 68 converts the first d- and q-axis voltage command values Vd1* and Vq1* in a two-phase fixed coordinate system of the rotation electric machine 20 to first U, V, and W-phase voltage command values Vu1, Vv1, and Vw1 in the three-phase fixed coordinate system in accordance with the first d- and q-axis voltage command values Vd1* and Vq1* output from the first converter 67 and the electrical angle θe. The three-phase converter 68 similarly converts the second d- and q-axis voltage command values Vd2* and Vq2* in the two-phase fixed coordinate system of the rotation electric machine 20 to second U, V, and W-phase voltage command values Vu2, Vv2, and Vw2 in the three-phase fixed coordinate system in accordance with the second d- and q-axis voltage command values Vd2* and Vq2* output from the first converter 67 and the electrical angle θe. According to the present embodiment, the first U, V, and W-phase voltage command values Vu1, Vv1, and Vw1 serve as sinusoidal signals having phases shifted from one another by 120 degrees in terms of the electrical angle θe, and the second U, V, and W-phase voltage command values Vu2, Vv2, and Vw2 serve as sinusoidal signals having phases shifted from one another by 120 degrees in terms of the electrical angle θe.

A first modulator 71 generates drive signals causing the switches SU1p to SW1n of the first inverter 40 to be turned ON or OFF through sinusoidal PWM control, in accordance with a carrier signal such as a triangular wave signal, the first U, V, and W-phase voltage command values Vu1, Vv1, and Vw1 output from the three-phase converter 68, and the source voltage VDC. The first modulator 71 generates the drive signals causing the switches SU1p to SW1n of the first inverter 40 for control of the d-axis current Idr to the d-axis current command value Id* output from the d-axis current command value limiter 65. The sinusoidal PWM control specifically includes generating the drive signals in accordance with comparison in magnitude between values obtained by dividing the first U, V, and W-phase voltage command values Vu1, Vv1, and Vw1 by "VDC/2" and the carrier signal. A second modulator 72 similarly generates drive signals causing the switches SU2p to SW2n of the second inverter 50 to be turned ON or OFF through the sinusoidal PWM control, in accordance with the carrier signal, the second U, V, and W-phase voltage command values Vu2, Vv2, and Vw2 output from the three-phase converter 68, and the source voltage VDC.

A d-axis current command value set portion 81 sets the d-axis current command value Id* such that a voltage vector determined in accordance with the first d- and q-axis voltage command values Vd1* and Vq1* output from the first converter 67 has magnitude not exceeding a voltage maximum value V max. The d-axis current command value set portion 81 further sets the negative d-axis current command value Id* such that a voltage vector determined in accordance with the second d- and q-axis voltage command values Vd2* and Vq2* output from the first converter 67 has magnitude not exceeding the voltage maximum value V max. The voltage maximum value V max has the maximum value of voltage that can be output from the first and second inverters 40 and 50 to the first and second coil groups M1 and M2, respectively.

Specifically, the d-axis current command value set portion 81 calculates a saturation factor Ran obtained by dividing an n-th q-axis voltage command value Vqn* by a square root Hen of a value obtained through subtracting a square of an n-th d-axis voltage command value Vdn* (n=1, 2) from a square of the voltage maximum value V max. The square root Hen and the saturation factor Ran are expressed by equations 1 and 2, respectively.

$$Hen=\sqrt{(V\max{}^2-Vdn^{*2})} \quad \text{(Equation 1)}$$

$$Ran=Vqn^*/Hen=Vqn^*/\sqrt{(V\max{}^2-Vdn^{*2})} \quad \text{(Equation 2)}$$

The d-axis current command value set portion 81 sets the negative d-axis current command value Id* in accordance with a difference between the saturation factor Ran and a predetermined target saturation factor Rtgn such that the saturation factor Ran reaches the target saturation factor Rtgn. The predetermined target saturation factor Rtgn has a prescribed value such as a value from 0.8 to 0.9.

Specifically, the d-axis current command value set portion 81 sets the negative d-axis current command value Id* as control input for feedback control of the saturation factor Ran to the target saturation factor Rtgn, such that the absolute value of the d-axis current command value Id* increases if the saturation factor Ran is less than the target saturation factor Rtgn. The d-axis current command value set portion 81 sets the d-axis current command value such that the absolute value of the d-axis current command value Id* decreases if the saturation factor Ran is more than the target saturation factor Rtgn. The d-axis current command value Id* set by the d-axis current command value set portion 81 will be hereinafter referred to as a second d-axis current command value Id*2.

A limit value set portion 82 sets the negative limit value Idm in accordance with the torque command value Tr* output from the d-axis current command value set portion 81. Specifically, the limit value set portion 82 selects one of multiple negative limit values Idm associated with the q-axis current Iqr output from the second converter 74, in accordance with the torque command value Tr*. The limit value set portion 82 sets, as the limit value Idm, one having a smaller absolute value out of the selected limit value Idm and the negative second d-axis current command value Id*2 output from the d-axis current command value set portion 81, and transmits the limit value Idm thus set to the d-axis current command value limiter 65.

When the driver rapidly rotates the steering wheel 90, the rotation electric machine 20 has electrical angle speed w increased as the torque command value Tr* increases. The rotation electric machine 20 has induced voltage that is in proportion to the electrical angle speed w and is generated at the q-axis about which the torque of the rotation electric machine 20 generates. The q-axis current Iqr thus decreases as the electrical angle speed w increases, to decrease the maximum value of the torque that can be generated by the rotation electric machine 20. In a state where the maximum value of the torque that can be generated by the rotation electric machine 20 is less than the torque command value Tr* (referred to as a voltage saturated state), the rotation electric machine 20 fails to output torque according to the torque command value Tr*.

In an exemplary case where the first coil group M1 has a non-salient pole structure including a permanent magnet, q-axis voltage Vdr is expressed by an equation 3 including the electrical angle speed ω. As expressed in the equation 3, at the q-axis voltage Vdr, the induced voltage included in a second member on a right side increases in accordance with the electrical angle speed w whereas the q-axis current Iqr included in a first member on the right side decreases. The equation 3 includes R indicating a resistance value of the first coil group M1, φ indicating an induced voltage constant of the rotation electric machine 20, and Ld indicating d-axis inductance of the rotation electric machine 20.

$$Vdr1=R\times Iqr+\omega\times(\phi+Ld\times Idr) \quad \text{(Equation 3)}$$

Field weakening control has been known as a technique of decreasing the induced voltage according to the electrical angle speed ω in the voltage saturated state. The field weakening control can cause the d-axis current Idr to have a predetermined negative value to achieve decrease in induced voltage.

The d-axis current command value limiter 65 limits the d-axis current command value Id* for control of the d-axis current Idr to be equal to or more than the negative limit value Idm. In a case where the absolute value of the limit value Idm is set to be small, the negative d-axis current Idr has an absolute value that cannot be increased sufficiently and the induced voltage cannot be decreased. In another case where the absolute value of the limit value Idm is set to be large, the absolute value of the negative d-axis current Idr increases and the rotation electric machine 20, the first inverter 40, and the second inverter 50 overheat.

In view of this, the present embodiment includes executing setting processing of setting the absolute value of the negative limit value Idm to be larger when the torque command value Tr* is large in comparison to a case where the torque command value Tr* is small. The induced voltage can thus be decreased preferably in the case where the torque command value Tr* is large, and overheat of the rotation electric machine 20, the first inverter 40, and the second inverter 50 can be inhibited in the other case where the torque command value Tr* is small.

Figure 5:
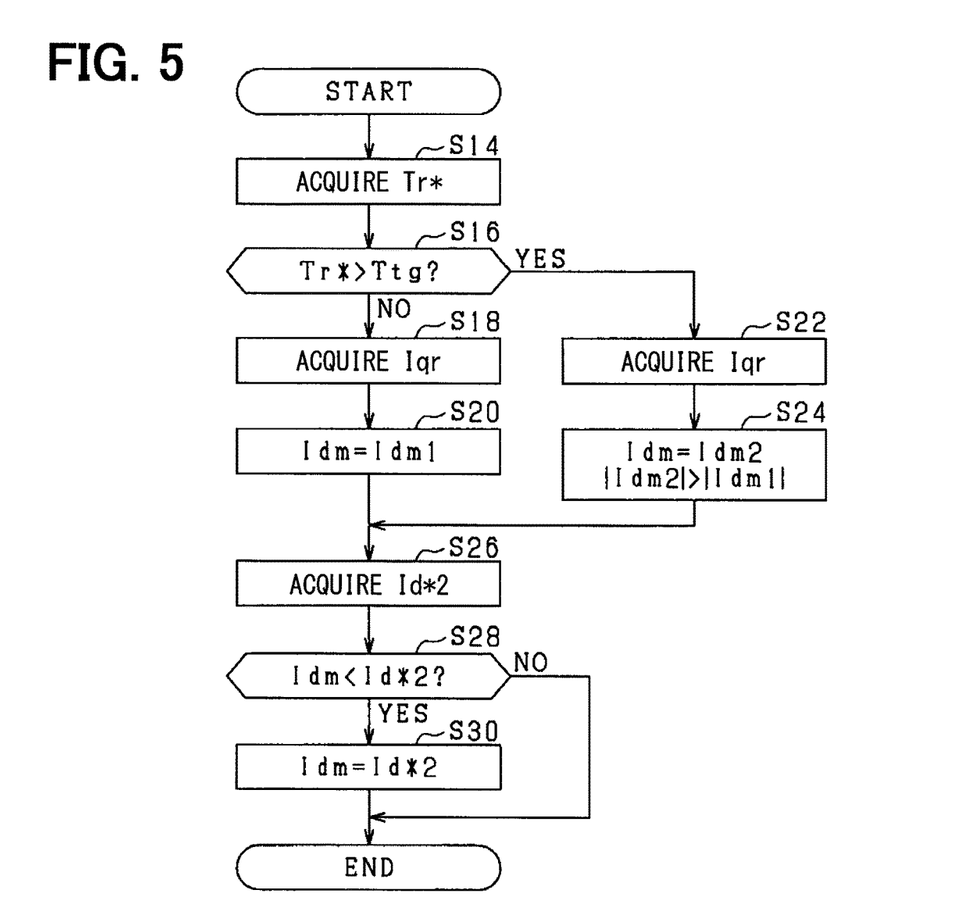
FIG. 5 is a flowchart of setting processing according to the first embodiment.

FIG. 5 is a flowchart of setting processing according to the present embodiment. This setting processing is repetitively executed at predetermined time intervals by, for example, the EPS ECU 60.

When the setting processing starts, the EPS ECU 60 initially in S14 acquires the torque command value Tr* from the torque sensor 94. The EPS ECU 60 acquires the torque command value Tr* set in accordance with the steering torque Trq. In S16, the EPS ECU 60 determines whether the torque command value Tr* acquired in S14 is more than a predetermined reference command value Ttg. The predetermined reference command value Ttg is a threshold for determination of whether the driver suddenly operates the steering wheel 90. The steering torque Trq increases when the driver suddenly operates the steering wheel 90. The electrical angle speed w thus increases and the torque command value Tr* exceeds the predetermined reference command value Ttg. Specifically, the steering torque Trq is large when the torque command value Tr* is more than the predetermined reference command value Ttg. In the present embodiment, the processing in S14 may correspond to a "torque command value acquisition section", and the processing in S16 may correspond to a "setting section".

In a case where negative determination is made in S16, the second converter 74 acquires the q-axis current Iqr in S18. In subsequent S20, a first limit value Idm1 (see FIG. 6) associated with the q-axis current Iqr acquired in S18 is determined and the limit value Idm is set to the first limit value Idm1. The first limit value Idm1 is set to a negative value.

In another case where positive determination is made in S16, the second converter 74 acquires the q-axis current Iqr in S22. In subsequent S24, a second limit value Idm2 (see FIG. 6) associated with the q-axis current Iqr acquired in S22 is determined and the limit value Idm is set to the second limit value Idm2. The second limit value Idm2 is set to a negative value having an absolute value larger than an absolute value of the first limit value Idm1. The processing in S18 and S22 according to the present embodiment may correspond to a "current acquisition section".

In S26, the d-axis current command value set portion 81 acquires the negative second d-axis current command value Id*2. S28 includes determining whether the limit value Idm set in S20 or S24 is less than the second d-axis current command value Id*2 acquired in S26.

In a case where negative determination is made in S28, in other words, when the absolute value of the negative second d-axis current command value Id*2 is more than the absolute value of the negative limit value Idm, the limit value Idm is kept at the value set in S20 or S24 and the setting processing ends. In another case where positive determination is made in S28, in other words, when the absolute value of the negative second d-axis current command value Id*2 is less than the absolute value of the negative limit value Idm, the limit value Idm is set to the second d-axis current command value Id*2 and the setting processing ends.

Figure 6:
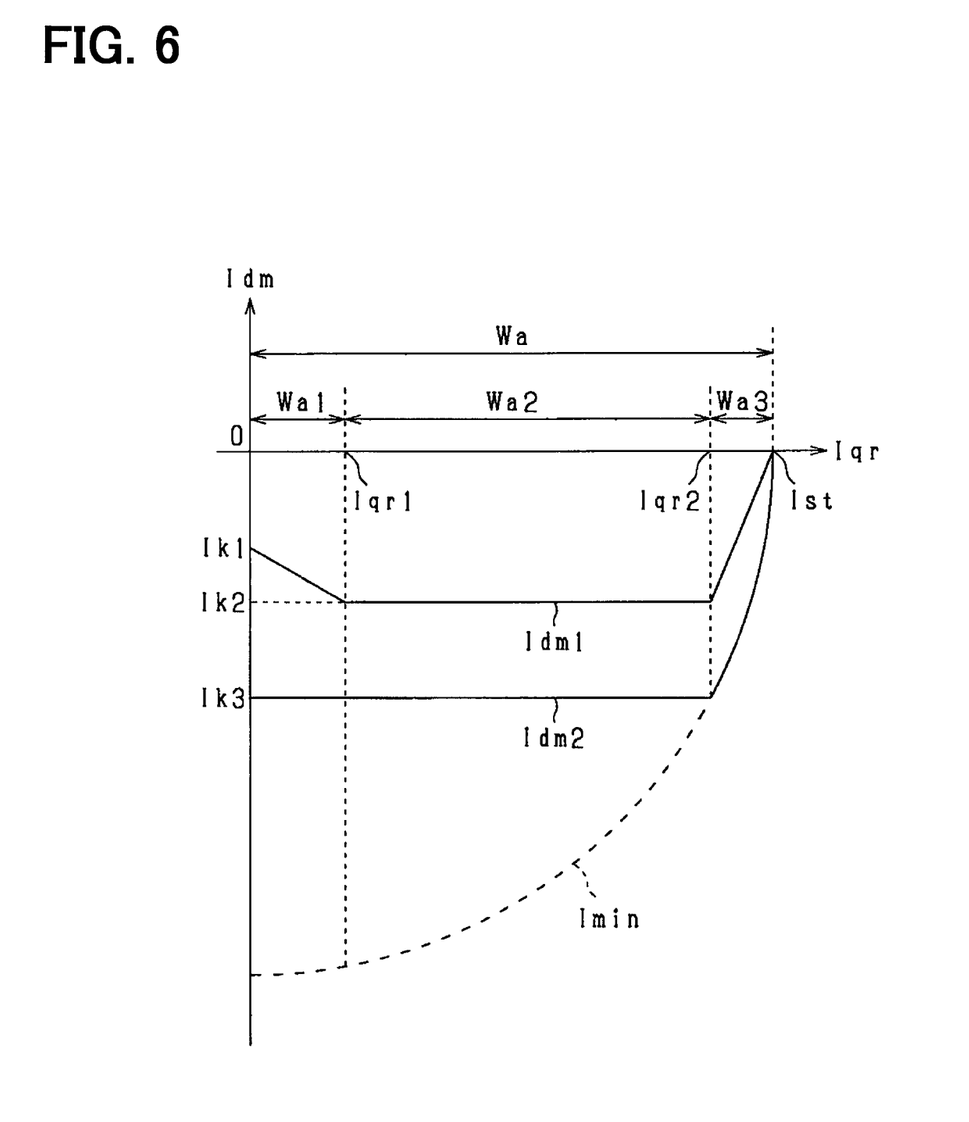
FIG. 6 is a graph indicating relation between a first limit value and a second limit value according to the first embodiment.

The first limit value Idm1 and the second limit value Idm2 will be described next with reference to FIG. 6. The storage 70 in the EPS ECU 60 stores a limit value map MPm associating the q-axis current Iqr with the first limit value Idm1 and the second limit value Idm2. As indicated in FIG. 6, the first limit value Idm1 and the second limit value Idm2 are set in a range Wa having the q-axis current Iqr varied from zero to rated current Ist of the rotation electric machine 20. The first limit value Idm1 is set to be less than the second limit value Idm2 in the range Wa. The EPS ECU 60 determines, in the setting processing, which the limit value Idm is set to the first limit value Idm1 or to the second limit value Idm2 in accordance with the q-axis current Iqr thus acquired and the limit value map MPm.

As indicated in FIG. 6, the first limit value Idm1 linearly decreases from a negative first reference value Ik1 to a negative second reference value Ik2 in a first range Wa1 having the q-axis current Iqr varied from zero to the first q-axis current Iqr1. The first limit value Idm1 is kept at the second reference value Ik2 in a second range Wa2 having the q-axis current Iqr varied from the first q-axis current Iqr1 to the second q-axis current Iqr2. The first limit value Idm1 linearly increases from the second reference value Ik2 to zero in a third range Wa3 having the q-axis current Iqr varied from the second q-axis current Iqr2 to the rated current Ist.

The absolute value of the first limit value Idm1 is set to decrease as the q-axis current Iqr decreases in the first range Wa1 for the following reason. In the first range Wa1, the q-axis current Iqr is relatively small and the rotation electric machine 20 needs small torque. When the absolute value of the negative d-axis current Idr increases in the first range Wa1, the rotation electric machine 20, the first inverter 40, and the second inverter 50 are likely to overheat. The absolute value of the first limit value Idm1 is set to decrease as the q-axis current Iqr decreases in the first range Wa1 in the present embodiment, thereby it may be possible to inhibit overheat of the rotation electric machine 20, the first inverter 40, and the second inverter 50.

The second limit value Idm2 is kept at a negative third reference value Ik3 that is less than the second reference value Ik2 in the first range Wa1 and the second range Wa2. The absolute value of the second limit value Idm2 does not decrease as the q-axis current Iqr decreases in the first range Wa1. In the first range Wa1 with the q-axis current Iqr being small, a difference between the first limit value Idm1 and the second limit value Idm2 is set to be larger than the difference in the second range Wa2 with the q-axis current Iqr being large.

In the third range Wa3, the second limit value Idm2 increases from the third reference value Ik3 to zero in accordance with a predetermined lower limit value I min determined by the rated current Ist of the rotation electric machine 20. The predetermined lower limit value I min is a limit value set on the basis of the fact that resultant current of the q-axis current Iqr and the d-axis current Idr is equal to or less than the rated current Ist. The third range Wa3 can thus be said to have the lower limit value I min that is more than the third reference value Ik3.

The present embodiment described in detail above achieves the following effect, for example.

The rotation electric machine 20 has increase of the electrical angle speed ω and decrease of the torque in the case where the torque command value Tr* is large. The absolute value of the negative limit value Idm needs to be set to be large for inhibition of decrease of the torque. In the other case where the torque command value Tr* is small, the absolute value of the negative limit value Idm needs to be set to be small for inhibition of overheat of the rotation electric machine 20, the first inverter 40, and the second inverter 50. The torque command value Tr* and the limit value Idm are thus correlated to each other.

The present embodiment includes setting the absolute value of the negative limit value Idm to be larger when the torque command value Tr* is large in comparison to the case where the torque command value Tr* is small. It may be possible to inhibit decrease in torque of the rotation electric machine 20 in the case where the torque command value Tr* is large. It may be possible to inhibit overheat of the rotation electric machine 20, the first inverter 40, and the second inverter 50 in the case where the torque command value Tr* is small. It may be possible to appropriately limit the d-axis current command value Id* of the rotation electric machine 20.

Particularly in the EPS device 10 that outputs torque according to operation by the driver of the steering wheel 90, the steering wheel 90 may suddenly be operated for prevention of collision or the like. Sudden operation of the steering wheel 90 increases the steering torque Trq of the steering shaft 91 to accordingly cause increase of the torque command value Tr*. The torque command value Tr* increases as the steering torque Trq of the steering shaft 91 increases. It may be possible to appropriately set the limit value Idm in accordance with operation of the steering wheel 90.

The storage 70 in the EPS ECU 60 according to the present embodiment stores the first limit value Idm1 and the second limit value Idm2. The limit value Idm is set to the first limit value Idm1 if the torque command value Tr* is less than the reference command value Ttg, and the limit value Idm is set to the second limit value Idm2 if the torque command value Tr* is more than the reference command value Ttg. The limit value Idm set to the first limit value Idm1 inhibits overheat of the rotation electric machine 20, the first inverter 40, and the second inverter 50 in the voltage unsaturated state or the like. The limit value Idm set to the second limit value Idm2 inhibits decrease in torque of the rotation electric machine 20 in the voltage saturated state or the like.

The first limit value Idm1 and the second limit value Idm2 are stored in association with the q-axis current Iqr in the present embodiment. In the first range Wa1 with the q-axis current Iqr being small, the difference between the first limit value Idm1 and the second limit value Idm2 is set to be larger than the difference in the second range Wa2 with the q-axis current Iqr being large. Specifically, the absolute value of the first limit value Idm1 is set to be relatively smaller in the first range Wa1 than in the second range Wa2.

In the first range Wa1, the q-axis current Iqr is relatively small and the rotation electric machine 20 needs small torque. The rotation electric machine 20 needs small torque particularly in the case where the limit value Idm is set to the first limit value Idm1. When the absolute value of the first limit value Idm1 is set to be relatively large in the first range Wa1 and the absolute value of the d-axis current Idr causing no torque of the rotation electric machine 20 increases, the rotation electric machine 20, the first inverter 40, and the second inverter 50 are likely to overheat. The absolute value of the first limit value Idm1 according to the present embodiment is set to be relatively smaller in the first range Wa1 than in the second range Wa2. It may be possible to inhibit increase in absolute value of the d-axis current Idr to preferably inhibit overheat of the rotation electric machine 20, the first inverter 40, and the second inverter 50.

Second Embodiment

A second embodiment will be described below with reference to the drawings mainly in terms of differences from the first embodiment.

Figure 7:
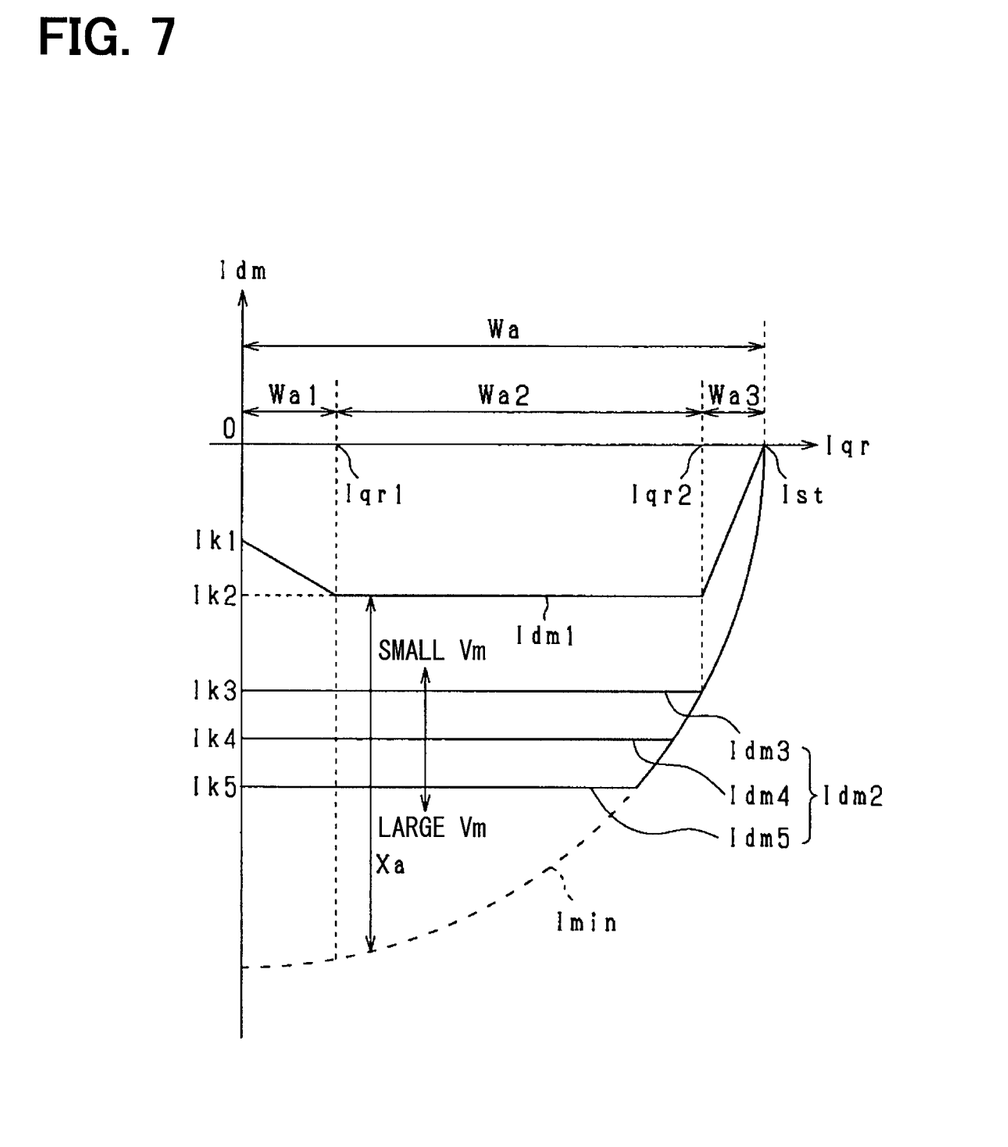
FIG. 7 is a graph indicating relation between a first limit value and a second limit value according to a second embodiment.

The present embodiment is different in that, as indicated in FIG. 7, the limit value map MPm stores multiple second limit values Idm2 associated with the q-axis current Iqr. The multiple second limit values Idm2 are set within a range Xa from the first limit value Idm1 to the lower limit value I min, and specifically third, fourth, and fifth limit values Idm3, Idm4, and Idm5 are stored. The lower limit value I min according to the present embodiment corresponds to a "predetermined lower limit value". The multiple second limit values may correspond to multiple second limit value items.

The third limit value Idm3 is kept at the third reference value Ik3 in the first range Wa1 and the second range Wa2. The fourth limit value Idm4 is kept at a negative fourth reference value Ik4 less than the third reference value Ik3 in the first range Wa1 and the second range Wa2. The fifth limit value Idm5 is kept at a negative fifth reference value Ik5 less than the fourth reference value Ik4 in the first range Wa1 and the second range Wa2. As to the fourth limit value Idm4, the lower limit value I min is more than the fourth reference value Ik4 in the second range Wa2. The fourth limit value Idm4 thus increases in accordance with the lower limit value I min in a partial range with the lower limit value I min being more than the fourth reference value Ik4 in the second range Wa2. The same applies to the fifth limit value Idm5.

The limit value map MPm includes the third, fourth, and fifth limit values Idm3, Idm4, and Idm5 associated with the vehicle speed Vm. In other words, the limit value map MPm associates the q-axis current Iqr and the vehicle speed Vm with the first limit value Idm1 and the second limit values Idm2. Specifically, the third limit value Idm3 is associated with the vehicle speed Vm in a low speed range not exceeding first reference speed. The fourth limit value Idm4 is associated with the vehicle speed Vm in a middle speed range more than the first reference speed and equal to or less than second reference speed that is higher than the first reference speed. The fifth limit value Idm5 is associated with the vehicle speed Vm in a high speed range more than the second reference speed.

Figure 8:
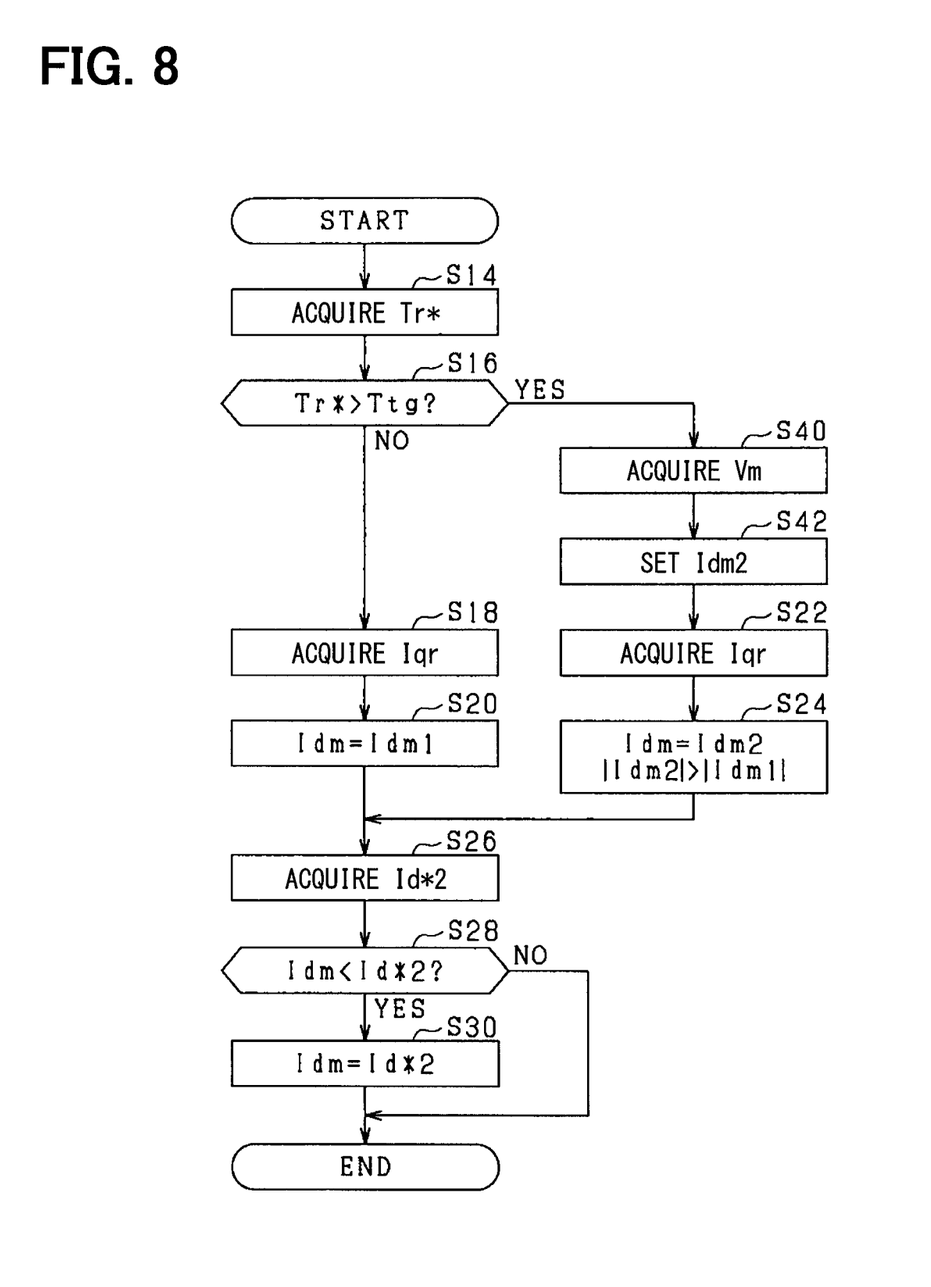
FIG. 8 is a flowchart of setting processing according to the second embodiment.

The present embodiment includes different setting processing. FIG. 8 is a flowchart of the setting processing according to the present embodiment. FIG. 8 shows processing identical to the processing illustrated in FIG. 5, which is denoted by the identical reference sign for convenience and will not be described repeatedly.

The setting processing according to the present embodiment includes S40 of acquiring the vehicle speed Vm from the vehicle speed sensor 34 if the torque command value Tr* acquired in S14 is determined as being more than the predetermined reference command value Ttg in S16, in other words, if the limit value Idm is set to the second limit value Idm2. In subsequent S42, the limit value Idm is set to the second limit value Idm2 in accordance with the vehicle speed Vm acquired in S40. Specifically as indicated in FIG. 7, the third limit value Idm3 is selected when the vehicle speed Vm is small. The selected second limit value Idm2 is switched from the third limit value Idm3 to the fourth limit value Idm4 and the fifth limit value Idm5 in the mentioned order as the vehicle speed Vm increases. In S42, when the vehicle speed Vm is large, the limit value Idm is set to the second limit value Idm2 having a larger difference from the first limit value Idm1 in comparison to a case where the vehicle speed Vm is small. The processing in S40 according to the present embodiment may correspond to a "vehicle speed acquisition section".

As described above, the second limit values Idm2 according to the present embodiment include the third, fourth, and fifth limit values Idm3, Idm4, and Idm5. When the vehicle speed Vm is large, the limit value Idm is set to the second limit value Idm2 having a larger difference from the first limit value Idm1 in comparison to the case where the vehicle speed Vm is small. When the vehicle speed Vm is large, the absolute value of the second limit value Idm2 is set to be relatively larger in comparison to the case where the vehicle speed Vm is small.

In comparison to the case where the vehicle speed Vm is small, when the vehicle speed Vm is large, the driver suddenly operates the steering wheel 90 at higher operation speed for prevention of collision or the like, and the torque command value Tr* increases accordingly. This causes increase in absolute value of the negative d-axis current Idr necessary for cancellation of the voltage saturated state of the rotation electric machine 20. When the vehicle speed Vm is large, the absolute value of the second limit value Idm2 is set to be relatively larger in the present embodiment in comparison to the case where the vehicle speed Vm is small. It may be possible to cancel the voltage saturated state when the vehicle speed Vm is large. The torque of the rotation electric machine 20 is secured, and it may be possible to quickly steer the wheels 95.

Other Embodiments

The rotation electric machine is not limitedly applicable to the EPS device.

The rotation electric machine may alternatively include only one coil group.

Figure 3:
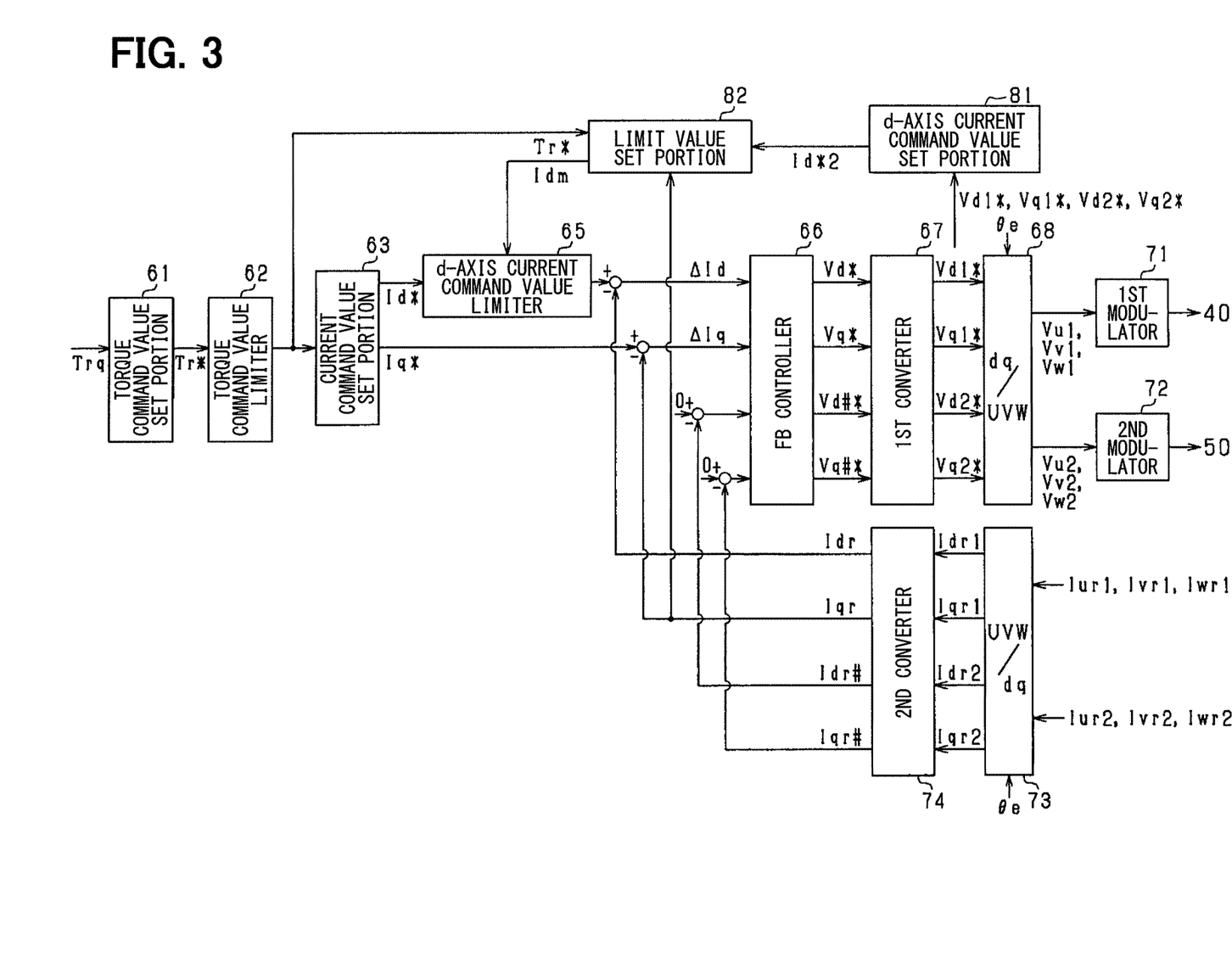
FIG. 3 is a diagram showing a circuit configuration of an EPS ECU according to a first embodiment.
Figure 4:
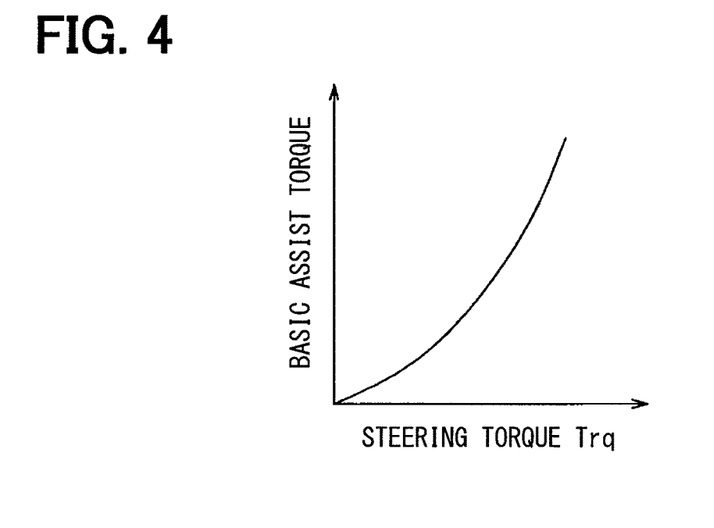
FIG. 4 is a graph showing relation between steering torque and basic assist torque.
Figure 9:
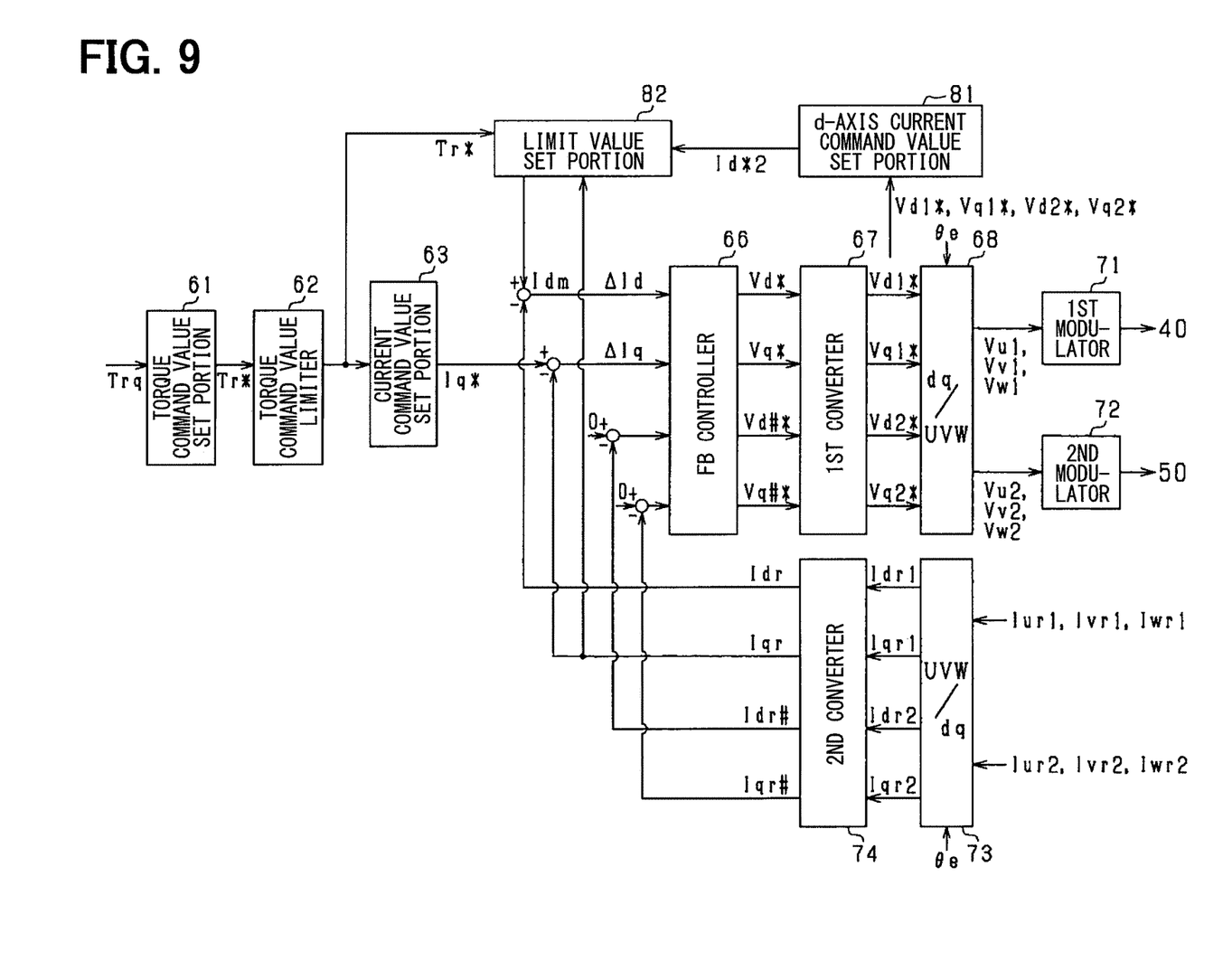
FIG. 9 is a diagram showing a circuit configuration of an EPS ECU according to a different embodiment.

FIG. 3 merely exemplifies the circuit configuration of the EPS ECU 60. The rotation electric machine 20 having the non-salient pole structure does not necessarily include the d-axis current command value limiter 65. FIG. 9 shows a circuit configuration of the EPS ECU 60 for the rotation electric machine 20 having the non-salient pole structure. The current command value set portion 63 sets the q-axis current command value Iq* in accordance with the torque command value Tr*, without setting the d-axis current command value Id*.

The FB controller 66 calculates the d-axis voltage command value Vd* as control input for feedback control of the d-axis current Idr output from the second converter 74, to the limit value Idm output from the limit value set portion 82.

The limit value may alternatively be calculated in accordance with a numerical expression or the like in place of the map.

It is noted that a flowchart or the processing of the flowchart in the present application includes multiple steps (also referred to as sections), each of which is represented, for instance, as S14. Further, each step can be divided into several sub-steps while several steps can be combined into a single step.

Controllers and methods described in the present disclosure may be implemented by a special purpose computer created by configuring a memory and a processor programmed to execute one or more particular functions embodied in computer programs. Alternatively, the control units, the controllers and the methods described in the present disclosure may be implemented by a special purpose computer created by configuring a processor provided by one or more special purpose hardware logic circuits. Further alternatively, the control units, the controllers and the methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

While various embodiments, configurations, and aspects of a rotation electric machine controller according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A rotation electric machine controller that controls a rotation electric machine, the rotation electric machine controller comprising:
  a torque command value acquisition section that acquires a torque command value for the rotation electric machine; and
  a setting section that sets a negative limit value limiting a d-axis current command value of the rotation electric machine, the d-axis current command value being calculated in accordance with the torque command value,
  wherein:
  in a state in which the torque command value is greater than a predetermined reference command value due to induced voltage generated by rapid rotation of the rotation electric machine due to user input,
  the setting section reduces induced voltage generated at a q-axis by decreasing the negative limit value of the d-axis current command value such that an absolute value of the negative limit value is
  (i) greater than an absolute value of the negative limit value set in a state in which the torque command value is equal to or less than the predetermined reference command value, and
  (ii) less than an absolute value of a predetermined lower limit value that is determined by a rated current of the rotation electric machine,
  wherein
  in a case where the torque command value is equal to or less than the predetermined reference command value, the setting section sets the negative limit value of the d-axis current command value to (i) linearly decrease from a negative first reference value to a negative second reference value in a first range having a q-axis current varied from zero to a first q-axis current, (ii) keep at the negative second reference value in a second range having the q-axis current varied from the first q-axis current to a second q-axis current, and (iii) linearly increase from the negative second reference value to zero in a third range having the q-axis current varied from the second q-axis current to the rated current of the rotation electric machine.

2. The rotation electric machine controller according to claim 1, wherein:
the setting section sets the negative limit value to a first limit value in response to that the torque command value is less than the predetermined reference command value; and
the setting section sets the negative limit value to a second limit value larger in absolute value than the first limit value in response to that the torque command value is more than the predetermined reference command value.

3. The rotation electric machine controller according to claim 2, further comprising:
a current acquisition section that acquires q-axis current of the rotation electric machine; and
a storage that stores a map in which the q-axis current is associated with the first limit value and the second limit value,
wherein:
the setting section determines which to set the negative limit value to the first limit value or the second limit value in accordance with the acquired q-axis current and the map; and
in the map, a difference between the first limit value and the second limit value in a case where the q-axis current is small is larger than the difference between the first limit value and the second limit value in a case where the q-axis current is large.

4. The rotation electric machine controller according to claim 2, further comprising:
a current acquisition section that acquires q-axis current of the rotation electric machine;
a vehicle speed acquisition section that acquires speed of a vehicle including the rotation electric machine; and
a storage that stores a map including the q-axis current and the speed of the vehicle associated with the first limit value and the second limit value,
wherein:
the map includes a plurality of second limit value items as the second limit value, the second limit value items being in a range from the first limit value to a predetermined lower limit value;
the setting section determines which to set the negative limit value to the first limit value or the second limit value items in accordance with the acquired q-axis current and the map; and
upon setting the negative limit value to one of the second limit value items, the setting section sets the negative limit value to the one of the second limit value items having a larger difference from the first limit value in a case where the speed acquired is high in comparison to a case where the speed is low.

5. A system for a rotation electric machine comprising:
an electric power steering device that outputs torque according to operation of a steering wheel;
a rotation electric machine that is included in the electric power steering device; and
the rotation electric machine controller according to claim 1,
wherein:
the torque command value increases as torque output from the rotation electric machine increases.

6. The rotation electric machine controller according to claim 2, further comprising:
a current acquisition section that acquires q-axis current of the rotation electric machine; and
a storage that stores a map in which the q-axis current is associated with the first limit value and the second limit value,
wherein:
the setting section determines which to set the negative limit value to the first limit value or the second limit value in accordance with the acquired q-axis current and the map; and
in the map, a difference between the first limit value and the second limit value in a case where the q-axis current is smaller than a predetermined current value is larger than the difference between the first limit value and the second limit value in a case where the q-axis current is larger than the predetermined current value.

7. The rotation electric machine controller according to claim 2, further comprising:
a current acquisition section that acquires q-axis current of the rotation electric machine;
a vehicle speed acquisition section that acquires speed of a vehicle including the rotation electric machine; and
a storage that stores a map including the q-axis current and the speed of the vehicle associated with the first limit value and the second limit value,
wherein:
the map includes a plurality of second limit value items as the second limit value, the second limit value items being in a range from the first limit value to a predetermined lower limit value;
the setting section determines which to set the negative limit value to the first limit value or the second limit value items in accordance with the acquired q-axis current and the map; and
upon setting the negative limit value to one of the second limit value items, the setting section sets the negative limit value to the one of the second limit value items having a larger difference from the first limit value in a case where the speed acquired is faster than a reference speed in comparison to a case where the speed is slower than the reference speed.

8. A rotation electric machine controller that controls a rotation electric machine, the rotation electric machine controller comprising:
at least one ECU that is configured to
acquire a torque command value for the rotation electric machine, and
set a negative limit value limiting a d-axis current command value of the rotation electric machine, the d-axis current command value being calculated in accordance with the torque command value,
wherein:
in a state in which the torque command value is greater than a predetermined reference command value due to induced voltage generated by rapid rotation of the rotation electric machine due to user input,
the at least one ECU reduces induced voltage generated at a q-axis by decreasing the negative limit value of the d-axis current command value such that an absolute value of the negative limit value is
(i) greater than an absolute value of the negative limit value set in a state in which the torque command value is equal to or less than the predetermined reference command value, and
(ii) less than an absolute value of a predetermined lower limit value that is determined by a rated current of the rotation electric machine,
wherein in a case where the torque command value is equal to or less than the predetermined reference command value, the at least one ECU sets the negative limit value of the d-axis current command value to (i) linearly decrease from a negative first reference value to a negative second reference value in a first range having a q-axis current varied from zero to a first q-axis current, (ii) keep at the negative second reference value in a second range having the q-axis current varied from the first q-axis current to a second q-axis current, and (iii) linearly increase from the negative second reference value to zero in a third range having the q-axis current varied from the second q-axis current to the rated current of the rotation electric machine.

\* \* \* \* \*